United States Patent [19]

Schalk

[11] Patent Number: 4,992,900

[45] Date of Patent: Feb. 12, 1991

[54] HEAD WHEEL ARRANGEMENT HAVING A ROTATING NUTS WITH REDUCED BACKLASH FOR A RECORDER

[75] Inventor: Adelbert Schalk, Furtwangen, Fed. Rep. of Germany

[73] Assignee: Deutsche Thomson-Brandt GmbH, Villingen-Schwenningen, Fed. Rep. of Germany

[21] Appl. No.: 295,705

[22] Filed: Jan. 11, 1989

[30] Foreign Application Priority Data

Jan. 21, 1988 [DE] Fed. Rep. of Germany ....... 3801622

[51] Int. Cl.[5] .......................... G11B 5/52; G11B 21/10
[52] U.S. Cl. ...................................... 360/107; 360/84; 360/109; 360/75; 360/130.24; 310/36
[58] Field of Search ................... 360/84, 107, 106, 75, 360/77, 130.22, 130.24; 310/36, 37, 38

[56] References Cited

U.S. PATENT DOCUMENTS 4,099,210 7/1978 Dolby .................................... 360/84
4,099,212 7/1978 Dolby .................................... 360/84

FOREIGN PATENT DOCUMENTS 3300303 7/1984 Fed. Rep. of Germany ........ 360/84

Primary Examiner—A. J. Heinz
Assistant Examiner—Alfonso Garcia
Attorney, Agent, or Firm—Joseph S. Tripoli; Joseph J. Laks; Sammy S. Henig

[57] ABSTRACT

A rotating head wheel for a recorder is displaceable in the direction of its axis of rotation. The displacement is produced by mounting the head wheel on a threaded spindle using a nut arrangement. The spindle rotates in the same direction as the head wheel and its rate of rotation is variable. The nut arrangement includes two nuts disposed along the same axis. A spring, disposed between the two nuts, pushes the nuts in opposite directions. The nuts are capable of moving in the direction of the axis but cannot be twisted relative to each other. In this way, the threads of the nuts make continuous contact with the thread of the spindle to compensate for a backlash between the spindle and the nuts.

9 Claims, 2 Drawing Sheets

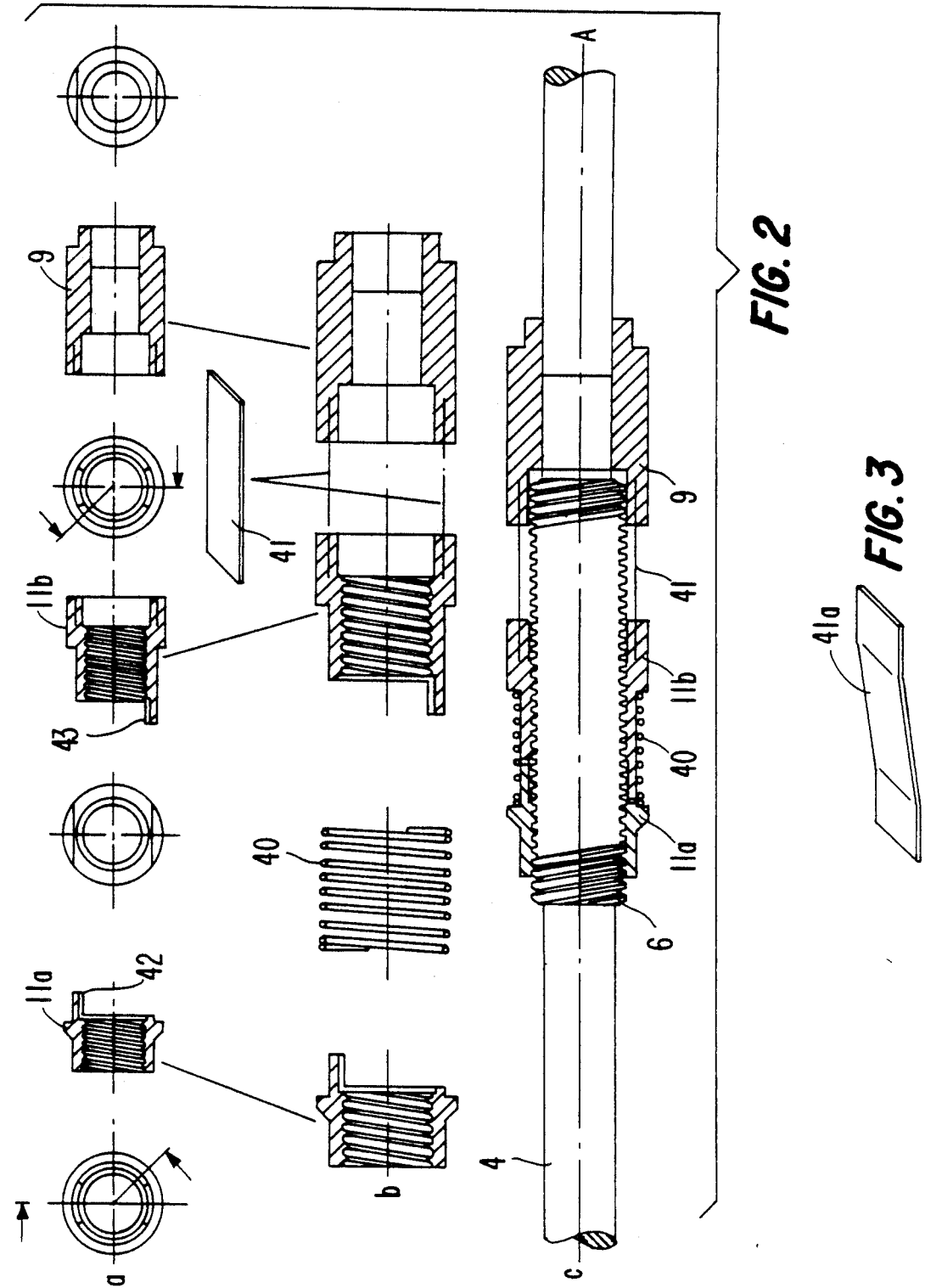

HEAD WHEEL ARRANGEMENT HAVING A ROTATING NUTS WITH REDUCED BACKLASH FOR A RECORDER

BACKGROUND OF THE INVENTION

The invention relates to a head wheel arrangement of a recorder.

A recording head wheel arrangement with a periodic stroke movement of the head wheel may be necessary for a so-called matrix-type recording. In the matrix-type recording, successive blocks are recorded with recording tracks running approximately parallel to the edge of the tape, as disclosed in a German Offenlegungsschrift (laid open patent application) DE-3509584. A specific embodiment of such head wheel arrangement is described in U.S. Pat. No. 4,774,606 in the name of Dietmar, entitled "HEAD WHEEL ARRANGEMENT FOR A RECORDER WITH THREADED SPINDLE FOR ADJUSTABILITY". In the Dietmar Patent arrangement, a rotating head wheel is mounted, by way of an engaging nut, on a threaded spindle rotating in the same direction. The rotation speed of the spindle varies in accordance with a control voltage to perform the stroke movement.

In such head wheel arrangement, requirements for the precision of the stroke movement are high, especially when the width of each track successively written due to the stroke movement is only 10 to 20 $\mu$m. In such head wheel arrangement, in which a rotation movement is turned into a movement of translation using spindle and nut, variations in turning moment may occur. Such variations in the turning moment may occur particularly due to a mechanical over-rigidity. Consequently, inaccuracies may appear in the linear translation movement.

It may be desirable to reduce variations of the turning moment due to the aforementioned mechanical over-rigidity for obtaining a stroke movement with high precision.

In accordance with a feature of the invention, the nut that engages the spindle includes two nuts which are biased by a spring in the axial direction. The spring prevents the nuts from being twisted relative to each other. Advantageously, both nuts are thereby continuously in contact with the respective flanks of the screw threads of the spindle. The result is that there is no more backlash between the nuts and the spindle.

In a preferred embodiment of the invention, one of the nuts is connected with a bush bearing surrounding the circumference of the spindle shaft such that the nuts cannot be moved axially in relation to the bearing in the direction of the axis. However, the nuts are flexible laterally with respect to the axis, i.e. in the radial direction. Consequently, defects in the concentricity of a circumference of the spindle or of the center line of the spindle in an amount of several micro-meters cause a sideways excursion of the nuts without considerably affecting the bearing. It should be understood that defects in the concentricity of the bearing, which is produced on a lathe, may be kept low, using suitable production engineering technique; whereas, defects in concentricity due to the threads of the spindle and of the nuts are considerably larger and more difficult to avoid. By reducing the variations in turning moment per spindle revolution, linear lift movement is obtained. The result is that the control of the linear speed and amplitude of the lift movement is improved.

SUMMARY OF THE INVENTION

A head wheel arrangement, embodying an aspect of the invention, for a recorder includes a head wheel having an axis about which the head wheel is rotatable. The arrangement includes a first nut portion connected to the head wheel and a second nut portion connected to the first nut portion such that one of the two nut portions is incapable of being twisted relative to the other one. A spindle rotatable about the axis is used for engaging the nut portions in such a way that the head wheel moves periodically in a stroke movement along the axis. One of the two nut portions is biased relative to the other one in a direction of the axis for reducing a backlash between the spindle and the nut portions.

The arrangement according to the present invention is particularly advantageous for use with the head wheel arrangement such as described in the Dietmar Patent. In the arrangement described in the Dietmar Patent, the rotating head wheel is mounted on a spindle which is also rotating and the number of revolutions of the spindle is altered to create a lift or stroke movement.

The present invention, however, is also useful in a situation where, for example, a nonrotating part of a head wheel arrangement, that is adjustable in the axial direction, is driven by an axial drive with a spindle and a nut. That part of the axial drive that cannot be moved in the axial direction may then be coupled with one or the other of two drive wheels rotating in opposite directions. A head wheel arrangement of this type is described in a German Pat. application No. P 37 32 791.

BRIEF DESCRIPTION OF THE DRAWINGS

FIG. 2 illustrates a spindle and nuts that are included in the wheel head arrangement of FIG. 1; and FIG. 3 illustrates a specific embodiment of a leaf spring which may be used in the arrangement of FIGS. 1 and 2.

DESCRIPTION OF THE PREFERRED EMBODIMENT

Figure 1:
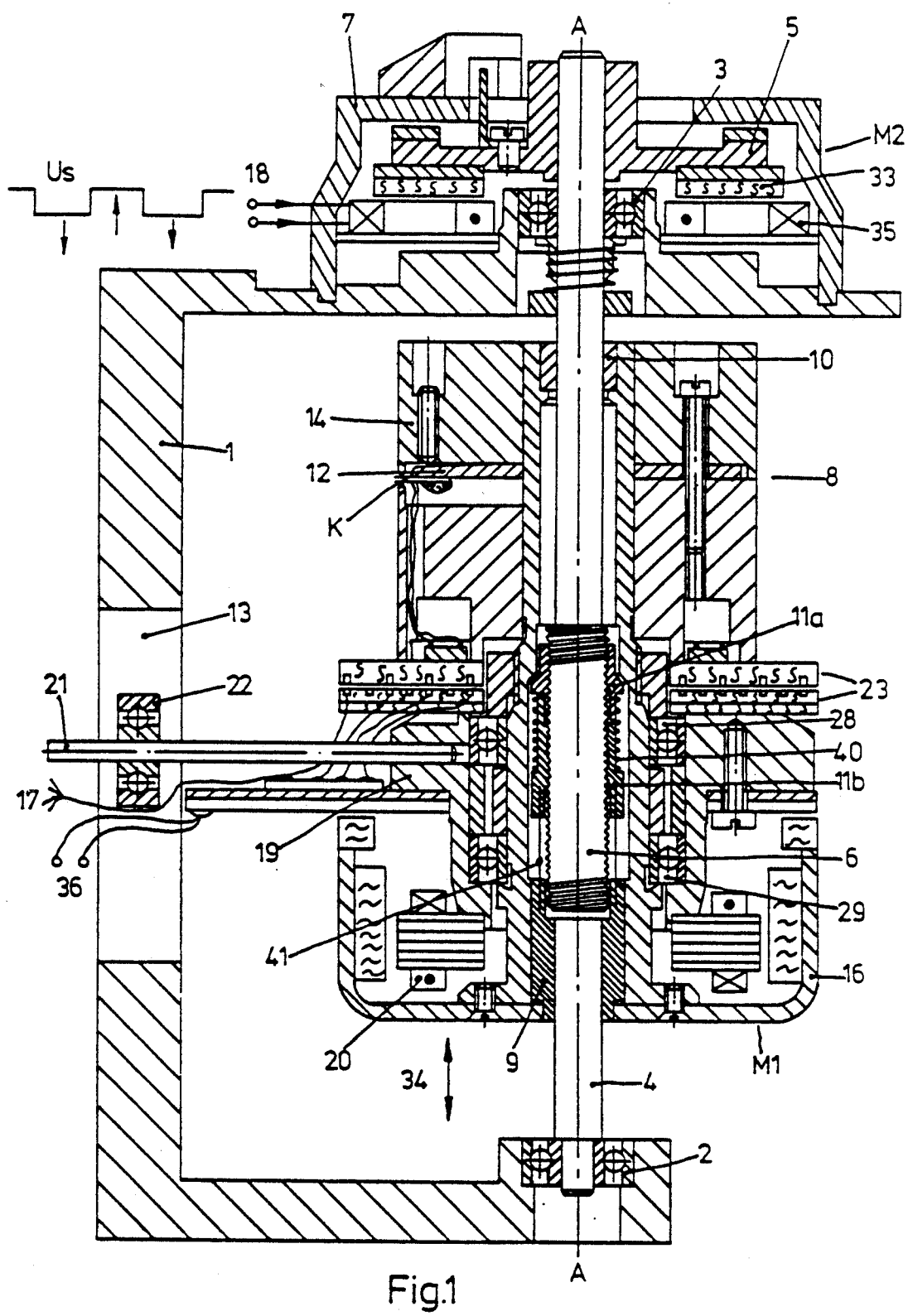
FIG. 1 illustrates a cross section of a head wheel arrangement, embodying an aspect of the invention.

In FIG. 1, a shaft 4 supporting a threaded spindle 6 is mounted by means of bearings 2 and 3 to be rotatable but not axially displaceable. The upper end of shaft 4 is connected with a rotor 5 of a motor M2 whose stator 7 is fixed to a frame 1. A head wheel 8 includes a head disc 12, and a predetermined number of head elements such as head K and drum 14. Head wheel 8 is rotatably mounted on shaft 4 by way of bush or slide bearings 9 and 10. Threaded spindle 6 engages into a nut arrangement that includes a top nut 11a and a bottom nut 11b that are fixed on drum 14. Head elements such as head K produce signals that are coupled to recording or playback amplifiers via rotating transducers 23 and flexible lines 17. A motor M1 has a rotor 16 which is additionally fastened to drum 14. A stator 19 of motor M1 includes a stator winding 20 and is mounted on drum 14 by way of bearings 28 and 29 so as to be rotatable relative to drum 14. Stator 19 is connected with frame 1 by way of a pin 21 and a bearing 22 so that pin 21 is axially movable in the direction of axis A in a slit 13 in frame 1, while preventing rotation of stator 19.

Parts 9, 10, 11a, 11b, 12, K, 14 and 16 form that part of the head wheel arrangement which rotates about axis A. Parts 19, 20 and 21 constitute that part of the head wheel arrangement which is unable to rotate but is displaceable in the direction of axis A. The functions of the aforementioned parts 9, 10, 12, K, 14, 16, 19, 20 and 21 are explained in detail in the Dietmar Patent that is incorporated by reference herein. Similar numerals and symbols in the Dietmar Patent and in FIG. 1 herein indicate similar items or functions.

As explained in the Dietmar Patent, Motor M1 is driven at a speed of approximately 6000 revolutions-per-minute (rpm) so that head wheel 8 rotates at that speed around axis A. Shaft 4 and threaded spindle 6 are driven by motor M2 in the same angular direction as head wheel 8 and at approximately the same rpm. If the rpm's were identical, there would be no relative angular movement between threaded spindle 6 and the nut arrangement that includes nuts 11a and 11b so that head wheel 8 would rotate about, but not moved in the direction of, axis A. As explained in the Dietmar Patent, periodic control voltage Us that is applied to terminals 18 of a winding 35 of motor M2 causes the number of revolutions of motor M2 to increase and decrease, alternately, e.g. between 5,990 rpm and 6,010 rpm, in a periodic manner. The difference between the rpm of spindle 6 and the rpm of the nut arrangement that includes nuts 11a and 11b produces a lift or stroke movement of head wheel 8 in the directions of arrow 34.

In accordance with an aspect of the invention, nuts 11a and 11b substantially cannot be twisted relative to each other but can be moved or displaced against each other in the axial direction of axis A. The two nuts, 11a and 11b, are, for example, pushed apart in the direction of axis A by a compression spring 40 which is disposed between nuts 11a and 11b. Nuts 11a and 11b are thus biased away from each other so that, regardless of tolerances, the inner thread of each of nuts 11a and 11b is continuously in contact with the respective flanks of the screw threads of spindle 6. Therefore, backlash is, advantageously, compensated or prevented.

Slide bearing 9 that is affixed to rotor 16 receives shaft 4. Nut 11b is connected with slide bearing 9 via a pair of thin leaf springs 41 lying in the direction of the axis A. Thus, any movement of nut 11b in relation to slide bearing 9 in the direction of the axis A is prevented. On the other hand, nut 11b can yield in the radial direction, i.e. it can accomplish a sideways movement with respect to the axis A. Advantageously, nut 11b can be moved in relation to the slide bearing 9, laterally, but not axially with respect to axis A.

In accordance with a feature of the invention, a defect in the concentricity of the thread of spindle 6 or in the center line of spindle 6 in a magnitude of, for example, several micrometers causes a sideways movement of nuts 11a and 11b that prevents slide bearing 9 from being affected by such defect. Slide bearing 9 is, preferably, produced virtually without defects in concentricity. It is important to maintain the extent of the defect in concentricity low for obtaining a uniform track width in the above mentioned matrix-type recording.

In FIG. 2a through 2c, nuts 11a and 11b, spring 40 and slide bearing 9 are shown separately from the other parts shown in FIG. 1. Similar symbols and numerals in FIGS. 1 and 2a-2c indicate similar items or functions. The same parts in the corresponding FIGS. 2a-2c are connected by straight lines for illustration purposes. FIG. 2a shows, in an exploded view, nut 11a having a web 42, nut 11b having a web 43 and also slide bearing 9. As shown in FIG. 2b, nut 11b and slide bearing 9 are connected with each other by means of the pair of thin leaf springs 41. Compression spring 40 is disposed between nuts 11a and 11b. Webs 42 and 43 substantially prohibit nut 11a from being twisted relative to nut 11b. However, webs 42 and 43 enable nuts 11a and 11b to move axially in the direction of axis A for obtaining the aforementioned required biasing of the nuts.

FIG. 2c shows the assembled arrangement. Nuts 11a and 11b having internal threads that engage spindle 6 can be biased in the direction of axis A relative to each other by means of spring 40. Nut 11b is connected, via the two leaf springs 41, with slide bearing 9. As shown in FIG. 1, bearing 9 is affixed to rotor 16 of motor M1.

In the embodiment of FIG. 1, the axial bias of nuts 11a and 11b is achieved by means of spring 40. Such bias may also be obtained by means of, for example, two magnets formed in nuts 11a and 11b, respectively, which are mutually repelling; thereby, nuts 11a and 11b are pushed apart from each other in the axial direction.

FIG. 3 shows a second embodiment of leaf spring 41 of FIG. 1 that is identified as leaf spring 41a in FIG. 3. Leaf spring 41a is formed with angles in two places so that the surface of spring 41a does not lie in one plane. By using such shape of leaf spring 41a, leaf spring 41a can exert a lateral pressure in a radial direction with respect to axis A. In this way, a defined desired general, or fundamental friction of the drive, referred to herein as the basic friction of the drive, may be obtained. The basic friction of the drive is selected for avoiding, or attenuating to a desired magnitude, vibrations.

What is claimed is:

1. A head wheel arrangement for a recorder, comprising:
   a head wheel having an axis about which said head wheel is rotatable;
   a first nut portion connected to said head wheel;
   a second nut portion;
   means for connecting said second nut portion to said first nut portion such that twisting of one of the two nut portions;
   means for rotating the two nut portions about said axis;
   means for biasing one of the two nut portions relative to the other one in a direction of said axis; and
   a spindle rotatable about said axis for engaging said nut portions in such a way that a relative rate of rotation between said spindle and said nut portions varies in a periodic manner that causes said head wheel to move periodically in a lift movement along said axis.

2. An arrangement according to claim 1, wherein one of said nut portions is connected with a bearing part for holding a shaft of said spindle rigidly in a direction of said axis and flexibly in a radial direction.

3. Arrangement according to claim 2, including a leaf spring, wherein one of said nut portions is connected with said bearing part in said axial direction through said leaf spring.

4. An arrangement according to claim 1, wherein said biasing means comprises a spring.

5. An arrangement according to claim 1, wherein said biasing means comprises mutually repelling magnets.

6. An arrangement according to claim 1 wherein said biasing means reduces a backlash between said spindle and at least one of said nut portions.

7. A head wheel arrangement for a recorder comprising:

a head wheel having an axis about which said head wheel is rotatable;

a first nut portion connected to said head wheel;

a second nut portion;

means for connecting said second nut portion to said first nut portion such that twisting of one of the two nut portions relative to the other one is prevented;

means for rotating the two nut portions about said axis;

means for biasing one of the two nut portions relative to the other one in a direction of said axis; and a spindle rotatable about said axis for engaging said nut portions in such a way that a relative rate of rotation between said spindle and said nut portions varies in a periodic manner that causes said head wheel to move periodically in a lift movement along said axis, wherein one of said nut portions is connected with a bearing part for holding a shaft of said spindle rigidly in a direction of said axis and flexibly in a radial direction; and a leaf spring, wherein one of said nut portions is connected with said bearing part in said axial direction through said leaf spring and said leaf spring is bent in such a way that it exerts a force in a direction that is radial relative to said axis.

8. An arrangement according to claim 7 wherein said leaf spring is shaped to form a surface in different planes in such a way that a predetermined basic friction of a drive that moves said head wheel is obtained.

9. An arrangement according to claim 8 wherein said spindle has a thread that engages a corresponding thread of each one of the two nut portions.

* * * * *

UNITED STATES PATENT AND TRADEMARK OFFICE
CERTIFICATE OF CORRECTION

PATENT NO. : 4,992,900

DATED : February 12, 1991

INVENTOR(S) : ADELBERT SCHALK

It is certified that error appears in the above-identified patent and that said Letters Patent is hereby corrected as shown below:

Col. 4, line 41      after "portions" insert -- relative to the other one is prevented --

The following references cited by applicant were not noted on patent title sheet:

US Patent No. 4,774,606, in the name of Uhde, dated 9/27/88

US Patent No. 4,782,411, in the name of Schalk, dated 11/1/88

Ger.Patent Appln. P3509584, dated 9/18/86

Ger. Patent No. 1,115,944, in the names of Egerer et al., dtd. 1961

Article in IEEE TRANSACTIONS ON CONSUMER ELECTRONICS, Vol. 34, No. 3, August 1988, entitled, MATRIX SCAN RECORDING, A NEW ALTERNATIVE TO HELICAL SCAN RECORDING ON VIDEOTAPE, in the names of Platte, Keseen and Uhde.

IBM Technical Disclosure Bulletins, Vol. 22, No. 4, dated Sept.1979, pgs. 1714-1716; Vol. 25, No. 2, dated July 1982, pgs. 811 and 812; Vol. 17, No. 1, dated June 1974, pg. 228.

UNITED STATES PATENT AND TRADEMARK OFFICE
CERTIFICATE OF CORRECTION

PATENT NO. : 4,992,900

DATED : February 12, 1991

INVENTOR(S) : Adelbert Schalk

It is certified that error appears in the above-identified patent and that said Letters Patent is hereby corrected as shown below:

Article entitled "FEINMECHANISCHE BAUELEMENTE", in the name of Hilderbrand, dated 1968, cover sheet, pgs. 623-626, and English translation.

Signed and Sealed this

Twenty-first Day of July, 1992

*Attest:*

DOUGLAS B. COMER

*Attesting Officer*     *Acting Commissioner of Patents and Trademarks*